(12) United States Patent  
Peterson et al.

(10) Patent No.: US 10,230,725 B2  
(45) Date of Patent: Mar. 12, 2019

(54) EDGE PROTECTION FOR INTERNAL IDENTITY PROVIDERS

(71) Applicant: SonicWALL US Holdings Inc., Santa Clara, CA (US)

(72) Inventors: Christopher D. Peterson, Santa Clara, CA (US); Abhishek Kumar, Bangalore (IN)

(73) Assignee: SONICWALL INC., Milpitas, CA (US)

( * ) Notice: Subject to any disclaimer, the term of this patent is extended or adjusted under 35 U.S.C. 154(b) by 107 days.

(21) Appl. No.: 15/332,807

(22) Filed: Oct. 24, 2016

(65) Prior Publication Data

US 2018/0115547 A1    Apr. 26, 2018

(51) Int. Cl.  
*H04L 29/06*        (2006.01)

(52) U.S. Cl.  
CPC ........ *H04L 63/0876* (2013.01); *H04L 63/029* (2013.01); *H04L 63/0272* (2013.01); *H04L 63/08* (2013.01); *H04L 63/083* (2013.01); *H04L 63/0861* (2013.01)

(58) Field of Classification Search  
CPC .............. H04L 63/029; H04L 63/0272; H04L 63/0876  
See application file for complete search history.

(56) References Cited

U.S. PATENT DOCUMENTS

| | | | | |
|---|---|---|---|---|
| 7,469,294 | B1 * | 12/2008 | Luo | H04L 63/0272 370/406 |
| 8,776,209 | B1 * | 7/2014 | Kumar | H04L 63/0272 380/270 |
| 9,483,627 | B1 * | 11/2016 | Ferg | G06F 21/31 |
| 2011/0314532 | A1 * | 12/2011 | Austin | H04L 9/3213 726/8 |
| 2016/0285858 | A1 * | 9/2016 | Li | H04L 63/0815 |
| 2016/0292694 | A1 * | 10/2016 | Goldschlag | H04L 63/20 |

FOREIGN PATENT DOCUMENTS

WO    WO 2018/081126    5/2018

OTHER PUBLICATIONS

PCT Application No. PCT/US2017/058094 International Search Report and Written Opinion dated Jan. 8, 2018.  
PCT/US17/58094, Edge Protection for Internal Identity Providers, Oct. 24, 2017.

* cited by examiner

*Primary Examiner* — Khoi V Le  
(74) *Attorney, Agent, or Firm* — Polsinelli LLP

(57) ABSTRACT

Systems and methods for edge protection for internal identity providers are provided. A first claimed embodiment of the present disclosure involves a method for edge protection for internal identity providers. The method includes receiving a service authentication request at a virtual private networking (VPN) appliance on an edge of a secure network. A client device external to the secure network can send the service authentication request. The VPN appliance can then send a synthetic service authentication request to an identity provider in the secure network. This synthetic service authentication request can be based on the service authentication request. The VPN can then receive an authenticated credential from the identity provider. The authenticated credential is responsive to the synthetic service authentication request. The VPN appliance can then send the authenticated credential from the VPN appliance to the client device.

15 Claims, 3 Drawing Sheets

EDGE PROTECTION FOR INTERNAL IDENTITY PROVIDERS

BACKGROUND OF THE INVENTION

1. Field of the Invention

The present invention generally concerns providing external access to an identity provider located within a secure network. More particularly, the present invention is related to use of a virtual private network appliance to manage external requests to an internal identity provider.

2. Description of the Related Art

Identity providers (IdPs) help networks manage identities and user accounts. Many services can utilize an identity provider to authenticate and keep track of users. Fully utilizing identity providers can allow a federated single-sign-on (SSO) experience. With the proliferation of the Internet, securing a network can be difficult as user devices, services, and identity providers can be a mixture of internal and external to a secure network. Past approaches would limit access to certain services (e.g., by placing the identity provider within the secure network where it cannot be accessed by the Internet) or would compromise security (e.g., by placing the identity provider on the edge of the secure network).

Traditionally, even when using an identity provider, a user must login to their virtual private network (VPN) using their credentials and then enter their credentials again to login to a service. Repeatedly entering credentials can be tiresome for a user.

There is, therefore, a need in the art for improved systems and methods of managing identity credentials in a secure network.

SUMMARY OF THE CLAIMED INVENTION

Systems and methods for edge protection for internal identity providers are provided. A first claimed embodiment of the present disclosure involves a method for edge protection for internal identity providers. The method includes receiving a service authentication request at a virtual private networking (VPN) appliance on an edge of a secure network. A client device external to the secure network can send the service authentication request. The VPN appliance can then send a synthetic service authentication request to an identity provider in the secure network. This synthetic service authentication request can be based on the service authentication request. The VPN can then receive an authenticated credential from the identity provider. The authenticated credential is responsive to the synthetic service authentication request. The VPN appliance can then send the authenticated credential from the VPN appliance to the client device.

A second claimed embodiment of the present invention involves a system for performing the method for edge protection for internal identity providers as described above. A third-claimed embodiment of the present invention concerns a non-transitory computer-readable storage medium having embodied thereon a program executable by a processor to perform a method for edge protection for internal identity providers as described above.

DETAILED DESCRIPTION

Systems and methods for edge protection for internal identity providers are provided. A first claimed embodiment of the present disclosure involves a method for edge protection for internal identity providers. The method includes receiving a service authentication request at a virtual private networking (VPN) appliance on an edge of a secure network. A client device external to the secure network can send the service authentication request. The VPN appliance can then send a synthetic service authentication request to an identity provider in the secure network. This synthetic service authentication request can be based on the service authentication request. The VPN can then receive an authenticated credential from the identity provider. The authenticated credential is responsive to the synthetic service authentication request. The VPN appliance can then send the authenticated credential from the VPN appliance to the client device.

Figure 1:
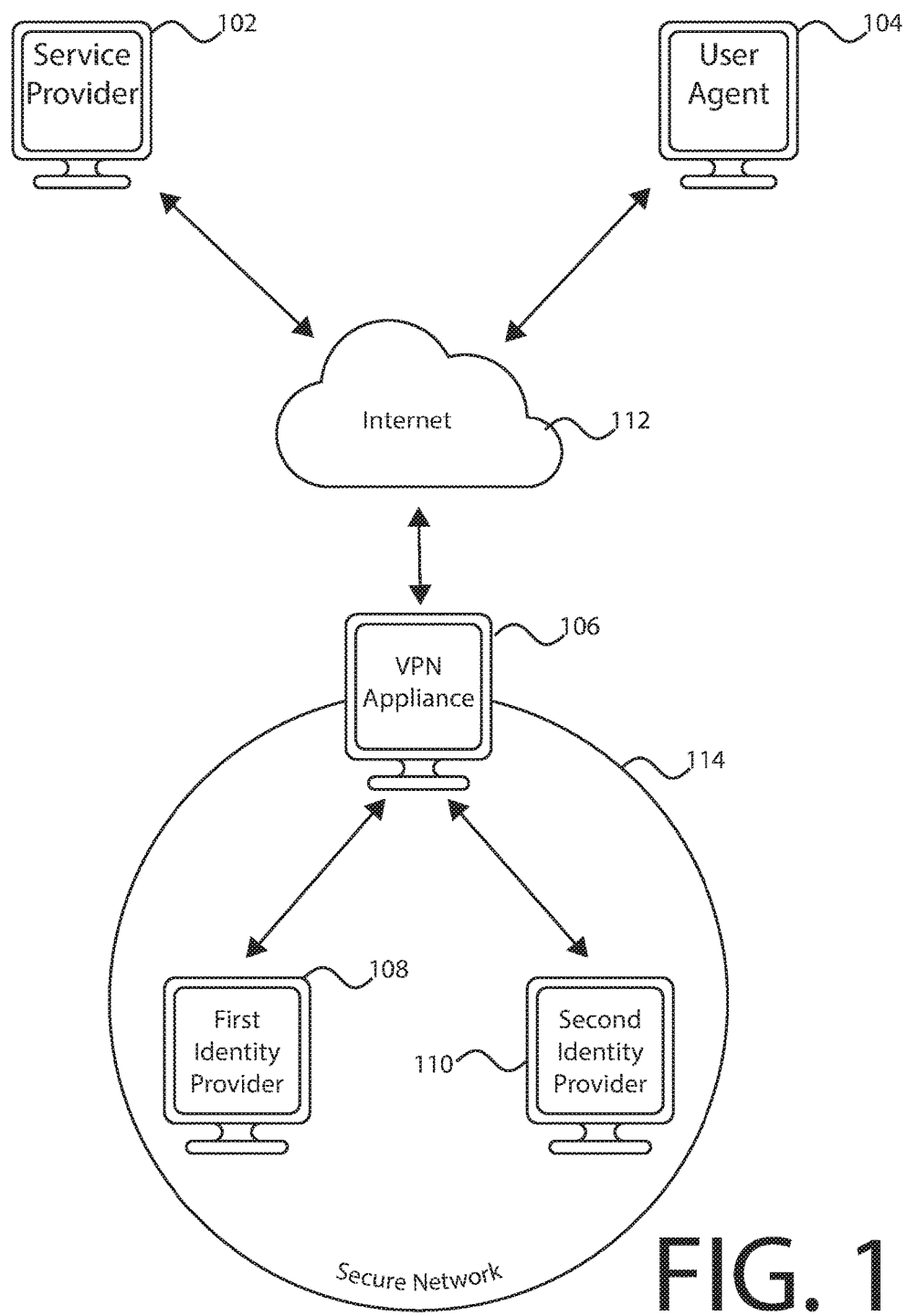
FIG. 1 illustrates an exemplary network configuration in which a system of edge protection for internal identity providers may be implemented.

FIG. 1 illustrates an exemplary network configuration in which a system of edge protection for internal identity providers may be implemented. Such a network configuration may include service provider 102, user agent 104, and virtual private network (VPN) appliance 106, which can intercommunicate via Internet 112. VPN appliance 106 can be on the edge of secure network 114 while at least a first identity provider 108 and a second identity provider 110 can be within secure network 114.

User agent 104 can be a computing device (which may or may not be executing a specific application) that makes requests on behalf of a client or user. User agent 104 may be used to access resources from service provider 102. User agent 104 can use an application, a portal (such as a web browser), a web site, a virtual machine, etc., to request and receive the resources. User agent 104 can be a portable electronic device such as a phone, tablet, laptop, smart watch, etc. User agent 104 can be a desktop computer, a server, etc. User agent 104 can connect to resources (e.g., service provider 102 and secure network 114 resources) via Internet 112 and/or directly (e.g., through a dedicated communication line). User agent 104 can have user input means (e.g., keyboard, mouse, microphone, fingerprint reader, camera, etc.) and output means (e.g., speakers, display, etc.).

Service provider 102 may be a server (or set of servers) that serve resources to requesting devices. Service provider 102 can be associated with a website, an application, a database, a network, etc. Service provider 102 can accept authentication credentials brokered by an external identity provider. For example, service provider can receive tokens or credentials provided by an OAuth (1.0 or 2.0) provider, a security assertion markup language (SAML) provider, an active directory service, etc. Service provider can also accept authentication credentials provided by a user (e.g., via user agent 104).

Secure network 114 can be a physical or logical network. Secure network 114 can have limited external (e.g., Internet 112) access. For example, a firewall, router, switch, etc. can prevent unwanted communications between Internet 112 and resources inside secure network 114. Resources or devices that can communicate with Internet 112 and resources within secure network 114 can be considered on the "edge" of secure network 114. In some embodiments, secure network 114 is a corporate network.

VPN appliance 106 can facilitate communication between resources within secure network 114 and external endpoints (e.g., resources and clients connected via Internet 112). VPN appliance 106 can oversee these communications and authenticate external requests. VPN appliance 106 can establish a secure tunnel into secure network 114 such that an external endpoint functions as if it were within secure network 114. For example, user agent 104 can access resources within secure network 114 as if user agent was located within secure network 114.

In some embodiments, VPN appliance 106 can provide a portal to access secure applications. For example, VPN appliance 106 can host a web-based portal. A user agent 104 can log into VPN appliance 106 and be presented with available applications. An application (or other resource) may be selected via the web-based portal, and VPN appliance 106 can facilitate authenticating the user and establishing an application session with the user. Exemplary applications include an instant messenger application, a word processor application, a document viewer application, a web browser application (e.g., for viewing intranet sites), a file browser application, etc. Applications can also be virtualized and run on a virtual machine that is located within secure network 114 or accessible via the internet 112.

First identity provider 108 and second identity provider 110 can be identity providers that authenticate user credentials. For example, user agent 104 can supply user credentials to VPN appliance 106, and VPN appliance 106 can supply the user credentials to first identity provider 108. First identity provider 108 can then authenticate the user credentials and indicate to VPN appliance 106 that user agent 104 is authenticated. First identity provider 108 and second identity provider 110 can provide different identity services. For example, first identity provider can provide at least one of active directory, OAuth, security assertion markup language (SAML), OpenID, or any other identity service while second identity provider 110 can provide a different selection of identity service(s). In some embodiments, an identity provider (e.g., first identity provider 108 and/or second identity provider 110) can be outside of secure network 114.

It should be understood that multiple configurations of service provider 102, user agent 104, VPN appliance 106, first identity provider 108, second identity provider 110, and secure network 114 are contemplated as appropriate for various embodiments. For example, one or both of first identity provider 108 and second identity provider 110 can be located outside or on the edge of secure network 114. In some embodiments, one or both of service provider 102 and user agent 104 are located within secure network 114.

Figure 2:
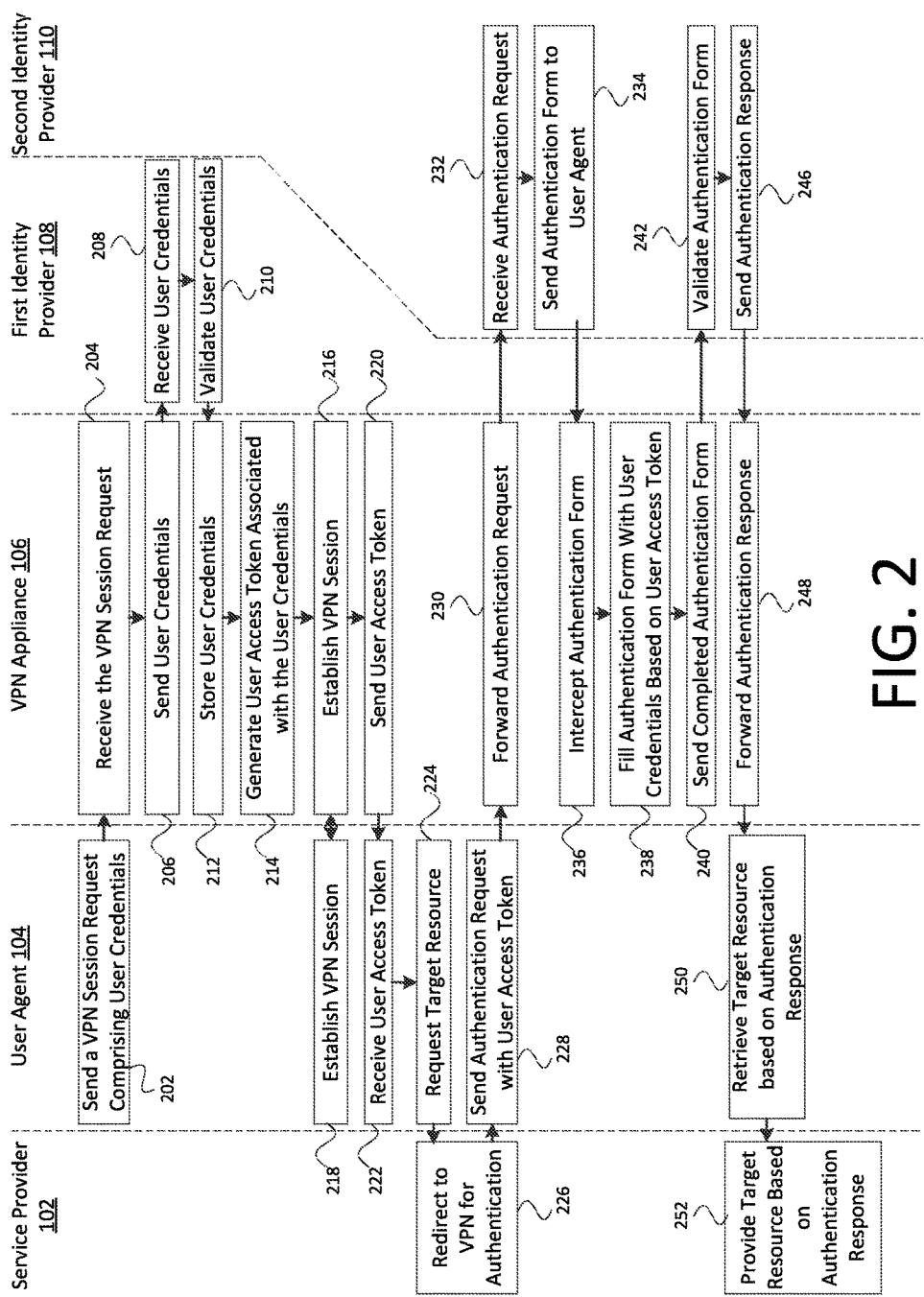
FIG. 2 illustrates a flowchart of an exemplary method of edge protection for internal identity providers.

FIG. 2 illustrates a flowchart of an exemplary method of edge protection for internal identity providers. Generally, this flowchart involves user agent 104 establishing a VPN session with VPN appliance 106, user agent 104 being authenticated by an identity provider (e.g., first identity provider 106 or second identity provider 110), and user agent 104 subsequently accessing a resource (e.g., an application) from service provider 102. Authentication requests from user agent 104 (or service provider 102) can be facilitated by VPN appliance 106 on the edge of secure network 114. By having the VPN appliance 106 facilitate these authentication requests, the identity provider(s) (e.g., first identity provider 108, and/or second identity provider 110) can be located within secure network 114 but still functionally accessible from Internet 112. Because VPN appliance 106 is facilitating these authentication requests, VPN appliance 106 can store a user's credentials during a first authentication and automatically apply them for future authentications. In other words, VPN appliance 106 can enable a single login experience so that a user does not have to repeatedly input their credentials.

User agent 104 can begin and send a VPN session request comprising user credentials to VPN appliance (step 202). For example, a client application on user agent 104 can attempt to establish a VPN tunnel with VPN appliance 106 using the user credentials. In some embodiments, user agent 104 can attempt to access a web portal on VPN appliance 106; user agent 104 can submit user credentials in order to access the web portal. In some embodiments, a two-factor authentication program can be utilized. For example, a user can be required to provide a synthetic service authentication key (e.g., a secure token) along with their username and password to authenticate with the VPN.

User credentials can include information that identifies a user account, a user, a group of users, a user classification, etc. For example, user credentials can include a username, password, email address, phone number, account identifier, biometric data (e.g., pertaining to a fingerprint, voice print, iris or facial scan, etc.), clearance level, position, location, access token, two-factor authentication code, etc. User credentials can also include identifiers associated with user agent 104 such as an IP address, a MAC address, serial number, device type (e.g., tablet, phone, laptop), connection type, session data (e.g., a cookie or session token), etc. User agent 104 can have user credentials stored in memory, can request user credentials from a user, detect biometric data using a camera or other sensor (e.g., a fingerprint reader), receive a physical access device (e.g., a smart card) to determine user credentials, etc. In some embodiments, user credentials include multiple versions of the same type of information (e.g., multiple email addresses, multiple user account identifiers) which can be especially useful when the user credentials are used for multiple authentication systems, schemes, services, accounts, etc.

VPN appliance 106 can receive the VPN session request (step 204). Steps 202 and 204 can be accomplished via a secure connection. For example, user agent 104 can encrypt the user credentials, and VPN appliance 106 can decrypt the user credentials. In some embodiments, VPN appliance 106 does not decrypt at least some of the user credentials. For example, the user credentials can be sent unencrypted. Alternatively, VPN appliance 106 can leave the user credentials encrypted (e.g., VPN appliance 106 might not have a decryption key for the user credentials) and first identity provider 108 can decrypt the user credentials.

VPN appliance 106 can then send user credentials to first identity provider (step 206). This can be for the purposes of authorizing the VPN session request. Step 206 can indicate what type of VPN session user agent 104 has requested. In some embodiments, VPN appliance 106 only sends a subset of user credentials to first identity provider 108. First identity provider 108 can then receive the user credentials (step 208).

First identity provider 108 can then validate the user credentials (step 210). This can include comparing the user credentials with a database to determine if the user credentials match a user account on first identity provider 108. The user account can match a set of permissions. First identity provider 108 can determine if the set of permissions allow the type of VPN session that is requested. First identity provider 108 can send a response to VPN appliance 106 including an authorization token allowing user agent 104 to connect to VPN appliance 106.

VPN appliance 106 can then store the user credentials (step 212). For example, VPN appliance 106 can store the user credentials in memory. VPN appliance 106 can then generate a user access token associated with the user credentials (step 214). The user access token can be associated with the user credentials in the memory. For example, the user access token can map to the user credentials. The user access token can be a pseudo-random identifier or can be derived from the user credentials.

VPN appliance 106 can establish a VPN session (step 216) with user agent 104. User agent 104 can reciprocate in establishing the VPN session (step 218). VPN appliance 106 can then send the user access token to user agent (step 220). User agent 104 can receive the user access token (step 222). It should be understood that the user access token can be transmitted during the establishment of the VPN session. The user access token can also be transmitted before the establishment of the VPN session. User agent 104 can store the user access token in memory (e.g., as a cookie).

User agent 104 can then request a target resource from service provider (step 224). Step 224 can be within the same user session as the preceding steps or in a different user session. The target resource can be an application, a file, a network, a communication link (e.g., video conference, phone call, connection, etc.), web site, etc. In some embodiments, service provider 102 is a third party to both user agent 104 and VPN appliance 106. Alternatively, service provider 102 can be controlled by the same organization that controls VPN appliance 106.

Service provider 102 can then redirect user agent 104 to VPN appliance for authentication (step 226). In some embodiments, the request for the target resource (step 224) can include information effective to indicate an authentication entity. For example, if service provider 102 operates a web service "example.com", user agent 104 can access a specific company's portal on the web service such as "acme.example.com". Service provider 102 can have a registry of identity providers for each specific company. This registry can include connection parameters such as an encryption key, a connection address, a connection port, etc. In some embodiments, the registry can indicate that VPN appliance 106 is the identity provider. Alternatively, the registry can identify second identity provider 110. Service provider 102 can redirect user agent 104 to VPN appliance 106 using the information in the registry. In some embodiments, service provider 102 can facilitate the redirect by accepting data from user agent 104 and forwarding the data to VPN appliance.

User agent 104 can then send authentication request with the user access token to VPN appliance (step 228). For example, the redirect can include an instruction to include the user access token with the authentication request. In some embodiments, this redirect and sending of the authentication request (steps 226 and 228) can be with little or no user engagement. For example, the user need not provide any user credentials. In some embodiments, the user access token is a session token for the VPN session. In some embodiments, the authentication request includes the user access token, alternatively a separate communication (before or after authentication request) can include the user access token. For the purposes of this disclosure, authentication request of step 228 can be termed a service authentication request.

VPN appliance 106 can then send authentication request to second identity provider (step 230). The authentication request of step 230 can be termed a synthetic service authentication request. Similarly, the completed authentication form sent to second identity provider 110 (as described in step 240, below) can be termed a synthetic service authentication request. Step 230 can include validating the user access token or a cookie from user agent 104. If the user access token or cookie is invalid, VPN appliance 106 can block the request. In some embodiments, the previous session has concluded, and step 230 is effective to restore the previous session using a cookie from user agent 104. In some embodiments, VPN appliance 106 uses the service authentication request itself as the synthetic service authentication request, thus resulting in the synthetic service authentication request being identical to the service authentication request. Alternatively, VPN appliance 106 can receive and process the service authentication request and, as part of processing of the service authentication request, VPN appliance 106 can send the synthetic service authentication request to second identity provider 110. VPN appliance 106 can determine the appropriate destination for the authentication request. For example, the authentication request can specify an authentication protocol, type, or scheme and VPN appliance 106 can determine the appropriate identity provider (e.g., first identity provider 108 or second identity provider 110) to satisfy the request. This can be especially helpful if the authentication request is addressed to VPN appliance 106 instead of being addressed to an identity provider. Second identity provider 110 can then receive the authentication request (step 232).

Second identity provider 110 can then send an authentication form to user agent (step 234). For example, the authentication form can include an instruction to provide at least a subset of user credentials. The authentication form can be a webpage for receiving user credentials.

VPN appliance 106 can then intercept the authentication form (step 236). For example, second identity provider 110 can send the authentication form to user agent 104 via VPN appliance 106 (e.g., the authentication form can be addressed to user agent 104). VPN appliance can analyze traffic coming from second identity provider 110 and determine that the traffic includes the authentication form and that it is sent to user agent 104. This can be accomplished by analyzing the address of the authentication form and, if it matches user agent 104, then VPN appliance 106 can intercept the authentication form by preventing it from continuing to user agent 104. Alternatively, VPN appliance can detect an authentication form based on the request that passes through at step 230. For example, VPN appliance 106 can refer to a URL in the request and identify the response.

In some embodiments, step 236 is omitted, and VPN appliance 106 instead modifies the authentication form and sends the modified authentication form to user agent 104. The modified form can be filled in such that user agent 104 does not need to prompt the user for their credentials. For example, VPN appliance 106 can modify an HTML field to include the username and password of the user account (or any other stored credentials). User agent 104 can then submit the form, returning it to VPN appliance 106. In some embodiments, user agent 104 auto-submits the form without user interaction. VPN appliance 106 can then fill the authentication form with user credentials based on the user access token (step 238). For example, VPN appliance 106 can use a database of user credentials and, using the user access token received in step 230, retrieve the associated user credentials. VPN appliance 106 can identify a subset of user credentials which are necessary to fill the authentication form. VPN appliance 106 can then use at least the subset of user credentials and generate an appropriate response with the necessary user credentials. It should be understood that all of the user credentials (not just a subset) can be used to generate a response to the form.

VPN appliance 106 can then send a completed authentication form to second identity provider (step 240). Second identity provider 110 can then receive and validate the authentication form (step 242). Second identity provider 110 can then send an authentication response (step 246). The authentication response can include a special authentication token effective to authenticate user agent 104 on service provider 102. VPN appliance 106 can forward the authentication response to user agent (step 248). The authentication response can be addressed to service provider 102, user agent 104, or VPN appliance 106.

User agent 104 can then retrieve the target resource based on the authentication response (step 250). In some embodiments, step 250 includes requesting the target resource using the authentication response. Service provider 102 can provide the target resource based on the authentication response (step 252).

Figure 3:
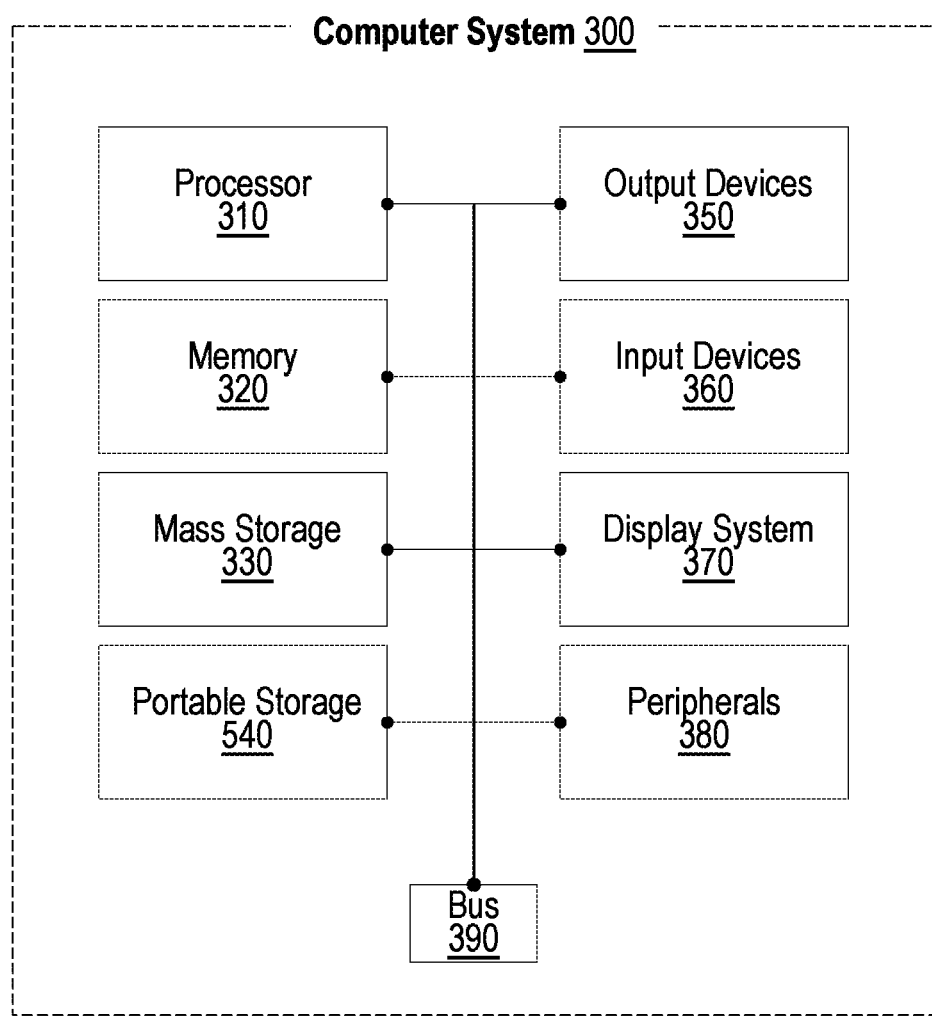
FIG. 3 illustrates an exemplary computing system that may be used to implement an embodiment of the present invention.

FIG. 3 illustrates an exemplary computing system 300 that may be used to implement some embodiments of the present invention. For example, any of the computer systems or computerized devices described herein may, in at least some cases, be a computing system 300. The computing system 300 of FIG. 3 includes one or more processors 310 and memory 310. Main memory 310 stores, in part, instructions and data for execution by processor 310. Main memory 310 can store the executable code when in operation. The system 300 of FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. However, the components may be connected through one or more data transport means. For example, processor unit 310 and main memory 310 may be connected via a local microprocessor bus, and the mass storage device 330, peripheral device(s) 380, portable storage device 340, and display system 370 may be connected via one or more input/output (I/O) buses.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 310.

Portable storage device 340 operates in conjunction with a portable non-volatile storage medium, such as a floppy disk, compact disk or Digital video disc, to input and output data and code to and from the computer system 300 of FIG. 3. The system software for implementing embodiments of the present invention may be stored on such a portable medium and input to the computer system 300 via the portable storage device 340.

Input devices 360 provide a portion of a user interface. Input devices 360 may include an alpha-numeric keypad, such as a keyboard, for inputting alpha-numeric and other information, or a pointing device, such as a mouse, a trackball, stylus, or cursor direction keys. Additionally, the system 300 as shown in FIG. 3 includes output devices 350. Examples of suitable output devices include speakers, printers, network interfaces, and monitors.

Display system 370 may include a liquid crystal display (LCD), a plasma display, an organic light-emitting diode (OLED) display, an electronic ink display, a projector-based display, a holographic display, or another suitable display device. Display system 370 receives textual and graphical information, and processes the information for output to the display device. The display system 370 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 380 may include any type of computer support device to add additional functionality to the computer system. For example, peripheral device(s) 380 may include a modem or a router.

The components contained in the computer system 300 of FIG. 3 are those typically found in computer systems that may be suitable for use with embodiments of the present invention and are intended to represent a broad category of such computer components that are well known in the art. Thus, the computer system 300 of FIG. 3 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 300 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 300 may be part of a multi-computer system that uses multiple computer systems 300, each for one or more specific tasks or purposes. For example, the multi-computer system may include multiple computer systems 300 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 300 from different networks communicatively coupled together via the internet (also known as a "distributed" system).

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for edge protection in a secure network, the method comprising:
receiving a virtual private networking (VPN) session request comprising user credentials from a client device;
authenticating the VPN session based on the user credentials;
storing the received user credentials in memory of a VPN appliance on an edge of a secure network;
generating a user access token associated with the received user credentials in response to the VPN session request;
sending the user access token to the client device;
receiving the user access token with a service authentication request at the VPN appliance, wherein the service authentication request is associated with accessing a resource by the client device external to the secure network;
identifying the user credentials based on the user access token;
generating a synthetic service authentication request to send with the identified user credentials from the VPN appliance to a second identity provider in the secure network, the synthetic service authentication request being generated based on the received service authentication request;
receiving an authentication form sent from the second identity provider to the VPN appliance, wherein the authentication form is responsive to the synthetic service authentication request, and the authentication form is a webpage with one or more HTML fields configured to receive a plurality of different versions of the user credentials, wherein the different versions are of a same type of credentials;
modifying the authentication form to include the user credentials by processing the plurality of the different versions of the same type of credentials for entry into the one or more HTML fields of the webpage authentication form;
sending the modified authentication form to the second identity provider, wherein the second identity provider validates that the client device is allowed access to the resource and sends an authentication response to the VPN appliance; and
receiving an authentication response at the VPN appliance in response from the second identity provider, wherein the client device is provided access to the requested resource after the authentication response is received at the VPN appliance.

2. The method of claim 1, wherein the synthetic service authentication request is sent in response to an authorization prompt from the second identity provider.

3. The method of claim 2, wherein the authorization prompt is addressed to the client device but is not sent to the client device.

4. The method of claim 1, wherein the VPN session request pertains to a first authorization scheme and the synthetic service authentication request pertains to a second authorization scheme.

5. The method of claim 1, wherein authenticating the VPN session includes sending the user credentials to a first identity provider, the first identity provider being distinct from the second identity provider.

6. The method of claim 1, wherein the VPN appliance communicates via a web portal.

7. The method of claim 1, wherein the VPN appliance is a network tunneling appliance.

8. A system for edge protection in a secure network, the system comprising:
a virtual private network (VPN) appliance at the edge of the secure network, wherein the VPN appliance:
receives a virtual private networking (VPN) session request comprising user credentials from a client device;
authenticates the VPN session based on the user credentials;
stores the received user credentials in memory;
generates a user access token associated with the received user credentials in response to the VPN session request;
sends the user access token to the client device;
receives the user access token with a service authentication request associated with accessing a resource by the client device external to the secure network;
identifies the user credentials based on the user access token; and
generates a synthetic service authentication request based on the received service authentication request; and
a second identity provider in the secure network that receives the synthetic service authentication request forwarded from the VPN appliance with the identified user credentials;
wherein the VPN appliance:
receives an authentication form from the second identity provider, wherein the authentication form is responsive to the forwarded service authentication request, and the authentication form is a webpage with one or more HTML fields configured to receive a plurality of different versions of the user credentials, wherein the different versions are of a same type of credentials;
modifies the authentication form to include the user credentials by processing the plurality of the different versions of the same type of credentials for entry into the one or more HTML files of the webpage authentication form; and
receives an authentication response in response to sending the modified authentication form to the second identity provider, wherein the client device is provided access to the requested resource after the authentication response is received at the VPN appliance.

9. The system of claim 8, wherein the modified authentication form does not require the user agent to supply further credentials.

10. The system of claim 9, wherein the VPN appliance further receives a credential submission from the user agent after sending the modified authentication form to the user agent and forwarding the credential submission to the second identity provider.

11. The system of claim 8, wherein the VPN session request pertains to a first authorization scheme and the service authentication request pertains to a second authorization scheme.

12. The system of claim 8, wherein the VPN appliance authenticates the VPN session by sending the user credentials to a first identity provider, the first identity provider being distinct from the second identity provider.

13. A non-transitory computer-readable medium having embodied thereon instructions executable by a processor of a computer to perform a method for edge protection in a secure network, the method comprising:
- receiving a virtual private networking (VPN) session request comprising user credentials from a client device;
- authenticating the VPN session based on the user credentials;
- storing the received user credentials in memory of a VPN appliance on an edge of a secure network;
- generating a user access token associated with the received user credentials in response to the VPN session request;
- sending the user access token to the client device;
- receiving the user access token with a service authentication request at the VPN appliance, wherein the service authentication request is associated with accessing a resource by a client device external to the secure network;
- identifying the user credentials based on the user access token;
- generating a synthetic service authentication request to send with the identified user credentials from the VPN appliance to a second identity provider in the secure network, the synthetic service authentication request being generated based on the received service authentication request;
- receiving an authentication form sent from the second identity provider to the VPN appliance, wherein the authentication form is responsive to the synthetic service authentication request, and the authentication form is a webpage with one or more HTML fields configured to receive a plurality of different versions of the user credentials, wherein the different versions are of a same type of credentials;
- modifying the authentication form to include the user credentials by processing the plurality of the different versions of the same type of credentials for entry into the one or more HTML fields of the webpage authentication form;
- sending the modified authentication form to the second identity provider, wherein the second identity provider validates that the client device is allowed access to the resource and sends an authentication response to the VPN appliance; and
- receiving an authentication response at the VPN appliance in response from the second identify provider, wherein the client device is provided access to the requested resource after the authentication response is received at the VPN appliance.

14. A method for edge protection in a secure network, the method comprising:
- receiving a virtual private networking (VPN) session request comprising user credentials from a client device;
- authenticating the VPN session based on the user credentials;
- storing the received user credentials in memory of a VPN appliance on an edge of a secure network;
- generating a user access token associated with the received user credentials in response to the VPN session request;
- sending the user access token to the client device;
- receiving the user access token from the client device;
- intercepting a login form from a service addressed for the client device, wherein the login form is a webpage with one or more HTML fields that can receive a plurality of different versions of the user credentials, wherein the different versions are of a same type of credentials;
- identifying that the received user credentials are associated with the user access token; and
- modifying the login form based on the received user credentials by processing the plurality of the different versions of the same type of credentials for entry into the one or more HTML fields of the login form, wherein the client device is provided access to the requested resource after the login form has been modified.

15. The method of claim 1, wherein the type of credentials includes number sets or email addresses.

* * * * *